United States Patent
Tadiello et al.

(10) Patent No.: US 10,894,714 B2
(45) Date of Patent: Jan. 19, 2021

(54) PROCESS AND PLANT FOR THE PRODUCTION OF SYNTHESIS GAS BY MEANS OF CATALYTIC STEAM REFORMATION OF A HYDROCARBONACEOUS FEED GAS

(71) Applicant: L'Air Liquide, Societe Anonyme pour l'Etude et l'Exploitation des Procedes Georges Claude, Paris (FR)

(72) Inventors: Jean-Philippe Tadiello, Frankfurt am Main (DE); Yue Chen, Shanghai (CN); Thomas Wenz, Dusseldorf (DE); Taekyu Kang, Newark, DE (US)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 16/093,875

(22) PCT Filed: Apr. 12, 2017

(86) PCT No.: PCT/EP2017/025088
§ 371 (c)(1),
(2) Date: Oct. 15, 2018

(87) PCT Pub. No.: WO2017/182140
PCT Pub. Date: Oct. 26, 2017

(65) Prior Publication Data
US 2019/0106323 A1   Apr. 11, 2019

(30) Foreign Application Priority Data

Apr. 22, 2016   (EP) ..................... 16400012

(51) Int. Cl.
*C01B 3/38* (2006.01)
*B01J 19/00* (2006.01)

(52) U.S. Cl.
CPC ............ *C01B 3/38* (2013.01); *B01J 19/0013* (2013.01); *C01B 3/384* (2013.01);
(Continued)

(58) Field of Classification Search
CPC ...................................................... C01B 3/38
(Continued)

(56) References Cited

U.S. PATENT DOCUMENTS

2005/0288381 A1   12/2005  Marrella et al.
2008/0244975 A1*  10/2008  Johnston ................ B01J 19/249
                                                48/197 FM
(Continued)

FOREIGN PATENT DOCUMENTS

DE   10 2010 044939   12/2011
EP   1 849 747        10/2007
GB   2 006 814        5/1979

OTHER PUBLICATIONS

International Search Report and Written Opinion for PCT/EP2017/025088, dated Jun. 30, 2017.

*Primary Examiner* — Douglas B Call
(74) *Attorney, Agent, or Firm* — Justin K. Murray

(57) ABSTRACT

A process and plant for producing a synthesis gas chiefly consisting of hydrogen and carbon monoxide by catalytic steam reformation of a hydrocarbonaceous feed gas, wherein the heat of burners required for the chemical reforming reactions to take place is generated by producing a flue gas and wherein, by utilizing the heat contained in the synthesis gas and in the flue gas, a pure steam is generated from boiler feed water and a process steam is generated from process condensate, wherein for the generation of the pure steam synthesis gas and flue gas are used and for the generation of the process steam a part of the pure steam is (Continued)

used as heat-transfer medium and the remaining part of the pure steam is discharged from the process as export steam.

4 Claims, 1 Drawing Sheet

(52) U.S. Cl.
CPC ............... *B01J 2219/00087* (2013.01); *B01J 2219/00157* (2013.01); *C01B 2203/0233* (2013.01); *C01B 2203/0495* (2013.01); *C01B 2203/0811* (2013.01); *C01B 2203/0816* (2013.01); *C01B 2203/0894* (2013.01); *C01B 2203/1235* (2013.01)

(58) Field of Classification Search
USPC ........................................................ 252/373
See application file for complete search history.

(56) References Cited

U.S. PATENT DOCUMENTS

| | | | |
|---|---|---|---|
| 2012/0148485 A1* | 6/2012 | Morrow | C01B 3/384 423/650 |
| 2015/0133701 A1* | 5/2015 | Townsend | C07C 29/149 568/885 |

\* cited by examiner

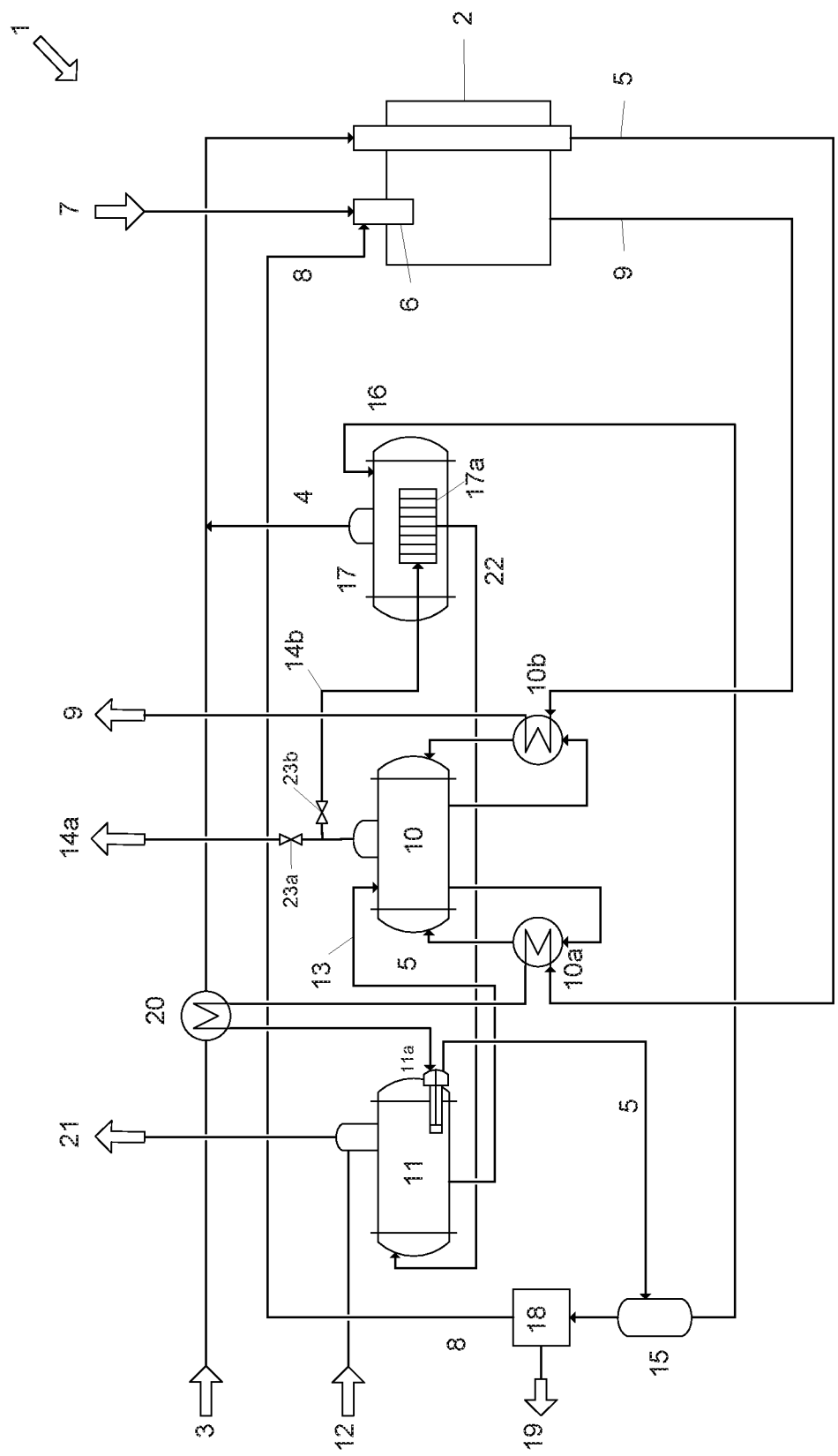

PROCESS AND PLANT FOR THE PRODUCTION OF SYNTHESIS GAS BY MEANS OF CATALYTIC STEAM REFORMATION OF A HYDROCARBONACEOUS FEED GAS

CROSS REFERENCE TO RELATED APPLICATIONS

This application is a § 371 of International PCT Application PCT/EP2017/025088, filed Apr. 12, 2017, which claims the benefit of EP16400012.7, filed Apr. 22, 2016, both of which are herein incorporated by reference in their entireties.

FIELD OF THE INVENTION

The invention relates to a process for producing a synthesis gas chiefly consisting of hydrogen and carbon monoxide by catalytic steam reformation of a hydrocarbonaceous feed gas, wherein the heat of burners required for the chemical reforming reactions to take place is generated by producing a flue gas, and wherein, by utilizing the heat contained in the synthesis gas and in the flue gas, a pure steam is generated from boiler feed water and a process steam is generated from process condensate.

The invention furthermore relates to a plant for carrying out this process.

BACKGROUND OF THE INVENTION

Such processes and plants are known. The underlying process for the catalytic steam reformation of a hydrocarbonaceous feed gas is described for example in Ullmann's Encyclopedia of Industrial Chemistry, Sixth Edition, Vol. 15, Gas Production, Chapter 2. The feed gases, a hydrocarbonaceous gas, such as e.g. natural gas and steam, are passed through externally heated reactor tubes filled with catalyst at elevated pressure, e.g. at 20 to 35 bar, and high temperature, e.g. 800 to 950° C. The feed gases are converted into synthesis gas rich in hydrogen and carbon monoxide. Such tubular reactor frequently is referred to as SMR, and the process is referred to as SMR process, an abbreviation for Steam-Methane-Reformer. For the separation of the hydrogen fraction from the synthesis gas the pressure swing adsorption process frequently is employed, which is described in chapter 5.5.3 of the same Ullmann volume.

For the economy of the process it is very important to use the heating energy expended for heating the feed gases and for carrying out the, in total, endothermal reforming reactions as far as possible for steam generation. The steam used together with the hydrocarbonaceous feed gas is referred to as process steam. It is obtained by re-evaporating the condensate formed and deposited from the synthesis gas upon cooling thereof. The heat content of the synthesis gas and of the flue gas however exceeds the heat quantity required for generating the process steam. To make good use of this excess heat, the same is utilized for generating so-called export steam, which chiefly is used outside the SMR process. In order not to load the export steam with impurities from the SMR process, fresh boiler feed water is used for its generation. A part of the export steam is utilized to compensate elutriation losses during the generation of process steam.

The utilization of the heat contained in the synthesis gas and in the flue gas for steam generation in many cases is effected by carrying out an indirect heat exchange between these gases and the process condensate and the boiler feed water. The German patent DE 10 2010 044 939 B3 describes a process carried out in this way.

The object of the invention consists in providing a process and a plant in which the heat transfer from the synthesis gas and from the flue gas for generating the vapors is solved in an alternative way.

SUMMARY OF THE INVENTION

The object is solved by the process according to claim 1 and by a plant according to the invention with the features of claim 3.

Process According to the Invention:

A process for producing a synthesis gas chiefly consisting of hydrogen and carbon monoxide by catalytic steam reformation of a hydrocarbonaceous feed gas, wherein the heat of burners required for the chemical reforming reactions to take place is generated by producing a flue gas and wherein, by utilizing the heat contained in the synthesis gas and in the flue gas, a pure steam is generated from boiler feed water and a process steam is generated from process condensate, wherein for the generation of the pure steam synthesis gas and flue gas are used and for the generation of the process steam a part of the pure steam is used as heat-transfer medium and the remaining part of the pure steam is discharged from the process as export steam.

In a preferred aspect of the process, the respective pressures of that part of the pure steam which is used as heat-transfer medium for the generation of process steam and that part which is discharged from the process as export steam are adjusted independent of each other. A pressure for the export steam, which frequently is required by a consumer external to the process, amounts to 52 bar. However, this pressure is not optimal for the process-internal use of the steam as heat-transfer medium. This aspect provides for lowering the pressure for this internal use to e.g. 39 bar. By this decrease in pressure the condensation enthalpy of the steam is increased by 5.8%, which leads to a reduction of the amount of pure steam required for the generation of process steam. In addition, the parts used for the generation of process steam can be designed for this lower pressure and hence less expensive.

Plant According to the Invention:

A plant for carrying out the process according to the invention, comprising:

At least one tubular furnace for carrying out the catalytic steam reformation,

A boiler for the thermal degasification of boiler feed water,

A steam boiler for the generation of pure steam from boiler feed water,

At least one heat exchanger each for heating and evaporating the boiler feed water by synthesis gas and by flue gas, At least one apparatus for the mechanical separation of condensate from the synthesis gas, A steam boiler for the generation of process steam, equipped with a heat exchanger suitable for the use of pure steam as heat-transfer medium.

In a preferred aspect of the plant according to the invention, separate control devices are present for adjusting and regulating the pressures of that part of the pure steam which is used as heat-transfer medium for the generation of process steam and of that part which is discharged from the process as export steam. By means of this equipment the steam pressure can be adjusted separately to the requirements of the export steam consumer and also of the internal process steam generation.

In yet another preferred aspect of the plant according to the invention, the steam boiler for the generation of process steam is equipped with an internal plate heat exchanger. Plate heat exchangers provide so much heat exchanger surface relative to the outside dimensions of the heat exchanger that the heat exchanger can be integrated in the steam boiler and an external heat exchanger thus can be omitted. Due to this construction the space requirement for the plant sections of the process steam generation is reduced.

In yet another preferred aspect of the plant according to the invention, the plant sections getting in contact with process condensate and process steam are made of stainless steel. Due to this construction it is possible to leave impurities, such as CO and $CO_2$, in the process condensate, i.e. the environment is not burdened by a degasification of the process condensate and these constituents are again supplied to the reforming process via the process steam. Due to the use of stainless steel, the addition of chemicals for binding oxygen and for pH adjustment can be omitted.

BRIEF DESCRIPTION OF THE DRAWINGS

Further features, advantages and possible applications of the invention can also be taken from the following description of an exemplary embodiment and numerical example as well as the drawing. All features described and/or illustrated form the subject-matter of the invention per se or in any combination, independent of their inclusion in the claims or their back-reference.

The process according to the invention will be explained below with reference to the FIGURE of the drawing, in which:

The FIGURE shows a flow diagram of the plant according to of an exemplary embodiment the invention.

DETAILED DESCRIPTION OF THE INVENTION

The FIGURE provides a flow diagram that shows the plant 1 according to an exemplary embodiment of the invention, which in this example serves the production of hydrogen from a hydrocarbonaceous feed gas, such as e.g. natural gas and steam. There are only shown the parts of the plant or the process which are essential for an understanding of the invention.

In the SMR reformer 2 designed as tubular furnace the feed gas consisting of natural gas 3 and process steam 4 is converted into synthesis gas 5 chiefly consisting of carbon monoxide and hydrogen. The SMR reformer 2 is heated by means of burners 6, of which only one is shown here, which are operated with air 7 and fuel gas 8, wherein a flue gas 9 is produced. To utilize the heat contained in the synthesis gas 5 and in the flue gas 9, the same are used as heat-transfer medium for heating the steam boiler 10, by means of the heat exchangers 10a and 10b, and the synthesis gas 5 in addition is also used for heating the natural gas 3, by means of the heat exchanger 20, and of the degassing boiler 11, by means of the heat exchanger 11a. In the degassing boiler 11 boiler feed water 12 is thermally degassed, the expelled gas 21 is discharged from the plant. Via conduit 13 the degassed and heated boiler feed water is passed into the steam boiler 10, in which it is evaporated to pure steam 14. A part of the pure steam 14 is discharged from the process or the plant as export steam 14a, the other part 14b is used as heating steam for heating the steam boiler 17 which is equipped with the internal plate heat exchanger 17a. The condensate obtained in the heat exchanger 17a is recirculated into the degassing boiler 11 via conduit 22.

The pressures of the steams 14a and 14b each are adjusted by means of the valves 23a and 23b.

After the heat exchange with boiler feed water in the heat exchanger 10b, the flue gas 9 is discharged from the process for the further treatment.

In the condensate separator 15 aqueous condensate 16 formed in the synthesis gas is separated and introduced into steam boilers 17. It is evaporated there to process steam 4 by means of the heat exchanger 17a, wherein a partial stream of the pure steam 14 is used as heating steam 14a, heat-transfer medium, and subsequently introduced into the degassing boiler 11. After the condensate separation, the synthesis gas 5 is treated in the pressure swing adsorption plant 18, wherein the hydrogen fraction 19 is separated from the synthesis gas and discharged from the plant or from the process for the further treatment. The residual gas 8 remaining after the hydrogen separation is supplied to the burners 6 of the SMR reformer 2 as fuel gas 8.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

INDUSTRIAL APPLICABILITY

The invention provides an alternative process and an alternative plant for the production of synthesis gas by steam reformation of a hydrocarbonaceous gas. The system for the production of process steam was redesigned, whereby energetic and constructive advantages are achieved. The invention therefore is industrially applicable.

LIST OF REFERENCE NUMERALS 1 plant according to the invention:
2 SMR reformer
3 natural gas stream
4 process steam
5 synthesis gas
6 burner
7 air for combustion
8 residual/fuel gas
9 flue gas
10 steam boiler for export steam, with heat exchangers 10a, b
11 degassing boiler with heat exchanger 11a
12 boiler feed water, fresh
13 boiler feed water, degassed
14 pure steam
14a export steam
14b heating steam
15 condensate separator
16 condensate
17 steam boiler for process steam, with heat exchanger 17a
17 pressure swing adsorption plant
18 hydrogen
19 heat exchanger
20 gas, expelled from boiler feed water
22 conduit for condensate recirculation
23 a, b valve for regulating the steam pressure

The invention claimed is:

1. A process for producing a synthesis gas consisting essentially of hydrogen and carbon monoxide by catalytic steam reformation of a hydrocarbonaceous feed gas, wherein the catalytic steam reformation uses burners to provide heat for a catalytic reforming reaction, wherein the burners produce a flue gas, wherein the process comprises the steps of:
   utilizing the heat from the synthesis gas and the flue gas to generate a pure steam from boiler feed water;
   using a first portion of the pure steam for providing heat to process condensate to produce a process steam, wherein a second part of the pure steam is discharged from the process as export steam; and
   adjusting a first pressure value for the first portion of the pure steam and a second pressure value for the second pure steam, wherein the first pressure value and the second pressure value are adjusted independent of each other,
   wherein the first pressure is selected based on improving a condensation enthalpy of the first pure steam.

2. The process as claimed in claim 1, wherein the first pressure value is lower than the second pressure value.

3. A process for producing a synthesis gas consisting essentially of hydrogen and carbon monoxide by catalytic steam reformation of a hydrocarbonaceous feed gas, the process comprising the steps of:
   introducing the hydrocarbonaceous feed gas in the presence of process steam to a steam methane reformer under conditions effective for producing the synthesis gas, wherein the steam methane reformer further comprises burners configured to burn a fuel gas in the presence of an oxidant to produce a flue gas;
   producing a pure steam by heat exchanging the flue gas and the synthesis gas with boiler feed water from a first steam boiler;
   withdrawing the pure steam from the steam boiler and splitting the pure steam into an export steam stream and a first portion;
   using the first portion of the pure steam to heat process condensate within a second steam boiler to produce the process steam; and
   adjusting a first pressure value for the first portion of the pure steam and a second pressure value for the export steam stream, wherein the first pressure value and the second pressure value are adjusted independent of each other,
   wherein the first pressure is selected based on improving a condensation enthalpy of the first pure steam.

4. The process as claimed in claim 3, wherein the first pressure value is lower than the second pressure value.

* * * * *